United States Patent
Read et al.

(10) Patent No.: US 6,236,623 B1
(45) Date of Patent: May 22, 2001

(54) SYSTEM AND METHOD FOR SYNCHRONIZING CLOCKS IN A PLURALITY OF DEVICES ACROSS A COMMUNICATION CHANNEL

(75) Inventors: James F. Read, Mission Hills; Leonard W. Moore, Northridge, both of CA (US)

(73) Assignee: Moore Industries, Sepulveda, CA (US)

( * ) Notice: Subject to any disclaimer, the term of this patent is extended or adjusted under 35 U.S.C. 154(b) by 0 days.

(21) Appl. No.: 09/179,678

(22) Filed: Oct. 16, 1998

(51) Int. Cl.[7] .............................. G04C 11/00; G04C 11/02
(52) U.S. Cl. .............................. 368/46; 368/47; 370/507; 375/354; 375/358
(58) Field of Search ................................. 368/10, 46, 47, 368/52; 370/451, 458, 445, 447–450, 457, 498, 503, 507, 508; 375/354–357, 358

(56) References Cited

U.S. PATENT DOCUMENTS

| | | | |
|---|---|---|---|
| 4,807,259 | * | 2/1989 | Tamasaka et al. .................... 575/109 |
| 4,912,706 | * | 3/1990 | Eisenberg et al. ................. 370/105.1 |
| 5,319,374 | * | 6/1994 | Desai et al. ........................... 347/387 |
| 5,408,506 | * | 4/1995 | Mingher et al. ...................... 375/356 |
| 5,442,639 | | 8/1995 | Crowder et al. . |
| 5,566,180 | | 10/1996 | Eidson et al. . |
| 5,590,116 | * | 12/1996 | Zhang .................................. 370/253 |
| 5,684,803 | * | 11/1997 | Thuy .................................... 370/451 |

* cited by examiner

Primary Examiner—Vit Miska
(74) Attorney, Agent, or Firm—Hogan & Hartson LLP

(57) ABSTRACT

A system and method is disclosed for synchronizing clocks in a plurality of devices connected by a communication channel. A master control device is coupled to one or more slave control devices, e.g., event recorders, across a communication channel. Preferably, the communication channel is implemented according to an RS-485 interface. By periodically interrogating and monitoring the responses of each of the slave control devices, the master control device determines the transit time, i.e., communication, delays to each of the slave control devices. Operating in conjunction with this data, the master control device can then interpret and/or adjust any event times reported by the event recorders to improve the relative time accuracy of the event recorders as compared to a time maintained by the master control device. Consequently, the control system can achieve a relative time synchronization accuracy between the master and slave times to within 100 microseconds and preferably 100 nanoseconds or less.

39 Claims, 9 Drawing Sheets

US 6,236,623 B1

SYSTEM AND METHOD FOR SYNCHRONIZING CLOCKS IN A PLURALITY OF DEVICES ACROSS A COMMUNICATION CHANNEL

BACKGROUND OF THE INVENTION

The present invention relates generally to a system and method for synchronizing clocks in a plurality of devices connected by a communication channel and is particularly suited for monitoring and/or accurately controlling the relative time relationship of events occurring proximate to one or more of the devices.

DESCRIPTION OF THE PRIOR ART

Event recorders have been used successfully for many years throughout industry, mainly for the purposes of scheduling maintenance actions and for post-incident analysis after an alarm or failure has occurred. For example, if a failure occurs on a power grid that caused portions of the grid to shut down, it would be useful to determine the sequence in which the shut downs occurred. Additionally, in the event of a catastrophic failure, e.g., an explosion in an oil refinery, the ability to determine the origin of the explosion by determining the sequence of events in the refinery could be extremely desirable. Event recorders work by time-stamping a signal when it arrives at the recorder's buffer. The time-stamping performed by such recorders relies upon an internal clock that is generally only accurate to within a millisecond. Typically, when multiple recorders are used, their internal clocks are not precisely synchronized even in systems where the recorders are in close proximity. Accordingly, determining the precise timing sequence of a group of events, e.g., a power shutdown or catastrophic failure, can be difficult due to the accumulated errors, i.e., from multiple clock and synchronization errors. Consequently, it is generally difficult to determine the event, and its corresponding location, which originated the sequence. In addition, if the recorders are widely distributed, the ability to synchronize the recorder's internal clocks typically becomes even more difficult and even less precise. Therefore, what is needed is a system that allows for precise synchronization between multiple event recorders and/or control devices that is essentially independent of the geographical distribution of such devices.

SUMMARY OF THE INVENTION

The present invention relates to a system and method for synchronizing clocks in a plurality of devices connected by a communication channel and is particularly suited for monitoring and/or accurately controlling the relative time relationship of events occurring proximate to one or more of the devices. Preferred embodiments of the present invention provide a master control device coupled to one or more slave control devices via a communication channel. The master control device, preferably microcomputer based, is a controller having an internal clock that is capable of periodic communication with the slave control devices to cause clocks within each slave control device to essentially synchronize with the master control device's internal clock. Furthermore, the master control device can command and/or monitor events at each of the slave control devices. The slave control devices, preferably microcomputer based, are controllers having internal clocks that are responsive to messages from the master control device. Additionally, the slave control devices include an interface to monitor local events, e.g., through a relay contact, and/or control external devices to cause local events to occur, e.g., through an output driver. Preferably, the communication channel is implemented according to an RS-485 interface. By periodically interrogating and monitoring the responses of each of the slave control devices, the master control device determines the transit time, i.e., communication, delays to each of the slave control devices. Operating in conjunction with this data, the master control device can then interpret and/or adjust any event times reported by the event recorders to improve the relative time accuracy of the event recorders as compared to a time maintained by the master control device. Consequently, embodiments of the present invention can achieve a relative time synchronization accuracy between master and slave times to within 100 microseconds and preferably 100 nanoseconds or less.

Accordingly, a system of the present invention is of particular use in determining the cause of a power shutdown or a catastrophic failure since the precision between event recorders permits more precise analysis of the actual order that events occurred. Additionally, slave control devices of the present invention can be constructed that allow for the precise synchronization of distributed control events.

A system for synchronizing clocks in a plurality of slave control devices interconnected via a communication channel might include a master control device, at least one slave control device, and a communication channel for providing a bidirectional communication path between the master control device and each of the slave control devices. In particular, the master control device comprises master clock circuitry for maintaining an essentially fixed frequency output and a master time, a communication controller for periodically sending an interrogation signal to each of the slave control devices and receiving an acknowledgment signal from each of the slave control devices in response thereto, each acknowledgment signal characterized by a time delay corresponding to each slave control device, and an offset register for storing one or more time delay values corresponding to each slave control device. Each slave control device comprises clock circuitry for maintaining a slave time, a communication controller for receiving the interrogation signal and sending the acknowledgment signal in response thereto, and an event controller for operating in association with the slave clock circuitry. The communication channel is used for sending and receiving the interrogation and the acknowledgment signals. Additionally, the slave communication controller is responsive to a synchronization signal sent from the master control device across the communication channel, used in conjunction with an associated time delay value in the offset register, to cause the slave time to essentially synchronize with the master time.

Such a system is particularly useful in precisely determining the time that events occur at one or more of the slave control devices when the master control device receives time-stamped event messages from the slave control devices. In a preferred embodiment, the offset register contains delay values for each of the slave control devices and adjusts the received time stamps when each event message is received. In an alternative embodiment, the delay value is sent from the master control device to the slave control device where it is retained in an offset memory. The slave control device then uses this value in synchronizing the slave time to the master time.

In a particularly preferred aspect of the present invention, the clock and the time of the master control device are periodically regulated by a GPS receiver which receives a globally precise timing signal, i.e., a timing signal that is precisely regulated to all places on the earth. Accordingly, multiple geographically-distributed systems of the present invention can be synchronized to a global reference, and thus to each other.

The invention will be best understood from the following description when read in conjunction with the accompanying drawings.

BRIEF DESCRIPTION OF THE DRAWINGS

FIG. 3b is a functional block diagram of an alternative implementation of the clock circuitry portion of the slave control device of FIG. 3a;

FIG. 4b is a functional block diagram of an alternative implementation of the clock circuitry portion of the slave control device of FIG. 4a;

DESCRIPTION OF THE PREFERRED EMBODIMENTS

The present invention relates to a system and method for synchronizing clocks in a plurality of devices across a communication channel. Preferred embodiments of the present invention provide a master control device coupled to one or more slave control devices, e.g., event recorders, through a communication channel. The master control device, preferably microcomputer based, is a controller having an internal clock that is capable of periodic communication with the slave control devices to cause internal clocks within each slave control device to essentially synchronize with the master control device's internal clock. Furthermore, the master control device can command and/or monitor events at each of the slave control devices. The slave control devices, preferably microcomputer based, are controllers having internal clocks that are responsive to messages from the master control device. Additionally, the slave control devices include an interface to monitor local events, e.g., through a relay contact, and/or control external devices to cause local events to occur, e.g., through an output driver. Preferably, the communication channel is implemented according to an RS-485 interface. By periodically interrogating and monitoring the responses of each of the slave control devices, the master control device determines the transit time delays, i.e., the time it takes for a message to transfer from the master control device to each slave control device. Operating in conjunction with this data, the master control device can interpret and/or adjust event times reported by the event recorders to improve the relative time accuracy of the times reported by the event recorders based on clocks in the event recorders as compared to the time maintained by a clock in the master control device. Consequently, embodiments of the present invention can achieve a relative time synchronization accuracy between the master and slave times to within 100 microseconds and preferably 100 nanoseconds or less.

Accordingly, a system of the present invention is of particular use in determining the cause of a power shutdown or a catastrophic failure since the precision between event recorders permits analysis of the actual order that events occurred. Additionally, slave control devices of the present invention can be constructed as remotely-controlled timing modules that allow for the precise synchronization of distributed control events, e.g., the actuation of a relay for powering a pump or a motor which form a part of a process control system.

Figure 1:
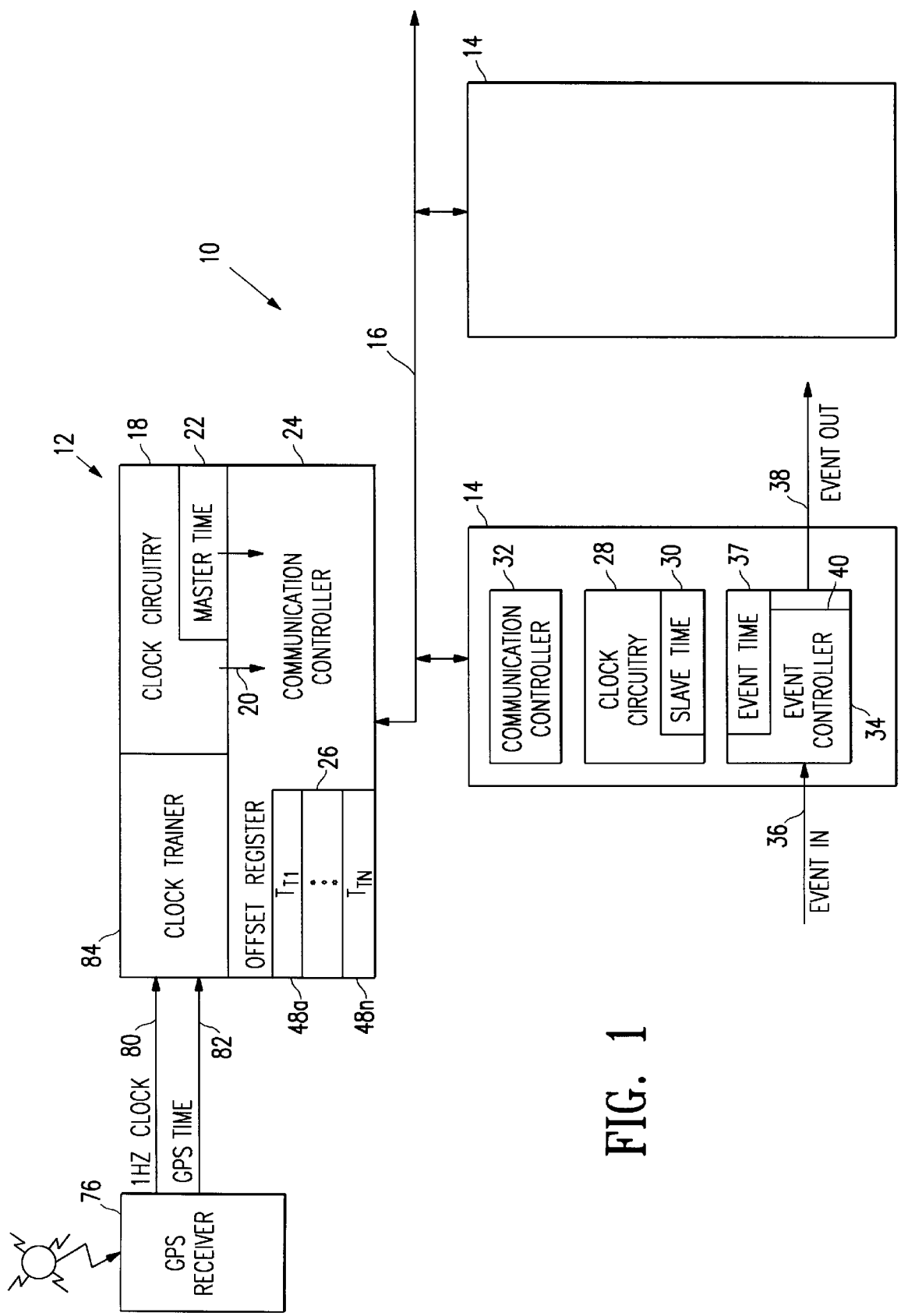
FIG. 1 is a top level functional block diagram of a preferred system for enabling clocks in a plurality of devices to be synchronized across a communication channel.

FIG. 1 shows a top level functional block diagram of a preferred system 10 for enabling clocks in a plurality of devices to be synchronized across a communication channel. A preferred clock synchronization system 10 may include a master control device 12, at least one slave control device 14, and a bidirectional communication channel 16 for providing a communication path between the master control device 12 and each of the slave control devices 14. Preferably, the communication channel 16 is comprised of a signal path implemented according to an RS-485 interface, a two wire bidirectional, differential interface. However, multiple RS-422 or RS-232 interfaces or a LAN interface could also be used to implement the communication channel 16.

A first control device, the master control device 12 for synchronizing the clocks of a plurality of slave control devices 14 to its internal clock, comprises clock circuitry 18 for maintaining an essentially fixed frequency output 20 and a master time 22, a communication controller 24 for communicating with each of the slave control devices 14, and an offset register 26, a memory for storing one or more time delay values corresponding to the communication delay times associated with one or more of the slave control devices 14.

The slave control devices 14 are comprised of clock circuitry 28 for maintaining a slave time 30, a communication controller 32 for communicating with the master control device 12, and an event controller 34, operating in association with the clock circuitry 28. The event controller 34 records the occurrence of an event identified at signal 36. Typically, signal 36 is indicative of an event that the system is monitoring, e.g., a system failure such as a tripped circuit breaker or an over temperature warning. An event time register 37 captures the slave time 30 at the moment that signal 36 is detected. Subsequently, the value stored in the event time register 37 is reported to the master control device 12 (preferably in response to an inquiry from the master control device 12). Alternatively, the controller 34 receives commands from the master control device 12 to cause an event to occur at a time which is stored in the event time register 37. When the value in the event time register 37 equals the slave time 30, the event controller 34 outputs a control signal 38 via driver output 40 to cause an event to occur, e.g, the startup of a pump.

The master and slave time portions are comprised of circuitry that counts forward, preferably indicating the time of day, in response to clocks in their respective clock circuitry portions. Embodiments of the present invention provide a method for periodically updating/correcting the slave times 30 relative to the master time 22 and, accordingly, the slave times 30 are essentially synchronized to each other.

Communication delays occur between the master 12 and slave controllers 14 due to physical and communication processing delays. Physical delays primarily correspond to the physical line length of the communication path 16 between the master control device 12 and each slave control device 14. Additionally, the quality of the physical communication path, e.g., corrosion or resistance, can be different for each portion of the communication path 16. Communication processing delays primarily correspond to the hardware/software portion of the communication controllers 32 in each of the slave control devices 14. Consequently, a different communication delay will typically exist for each slave control device 14. Embodiments of the present invention compensate for these differences so that the slave time 30 in each slave control device 14 essentially corresponds to the master time 22 in the master control device 12. To accomplish this synchronization, the master control device 12 periodically interrogates the slave control devices 14 to individually determine the corresponding communication delay for each slave control device 14. In a preferred embodiment, each of these corresponding communication delays is stored in the main controller 12, preferably within the offset register 26. Alternatively, each of these delays can be forwarded to the associated slave control device 14.

Figure 2:
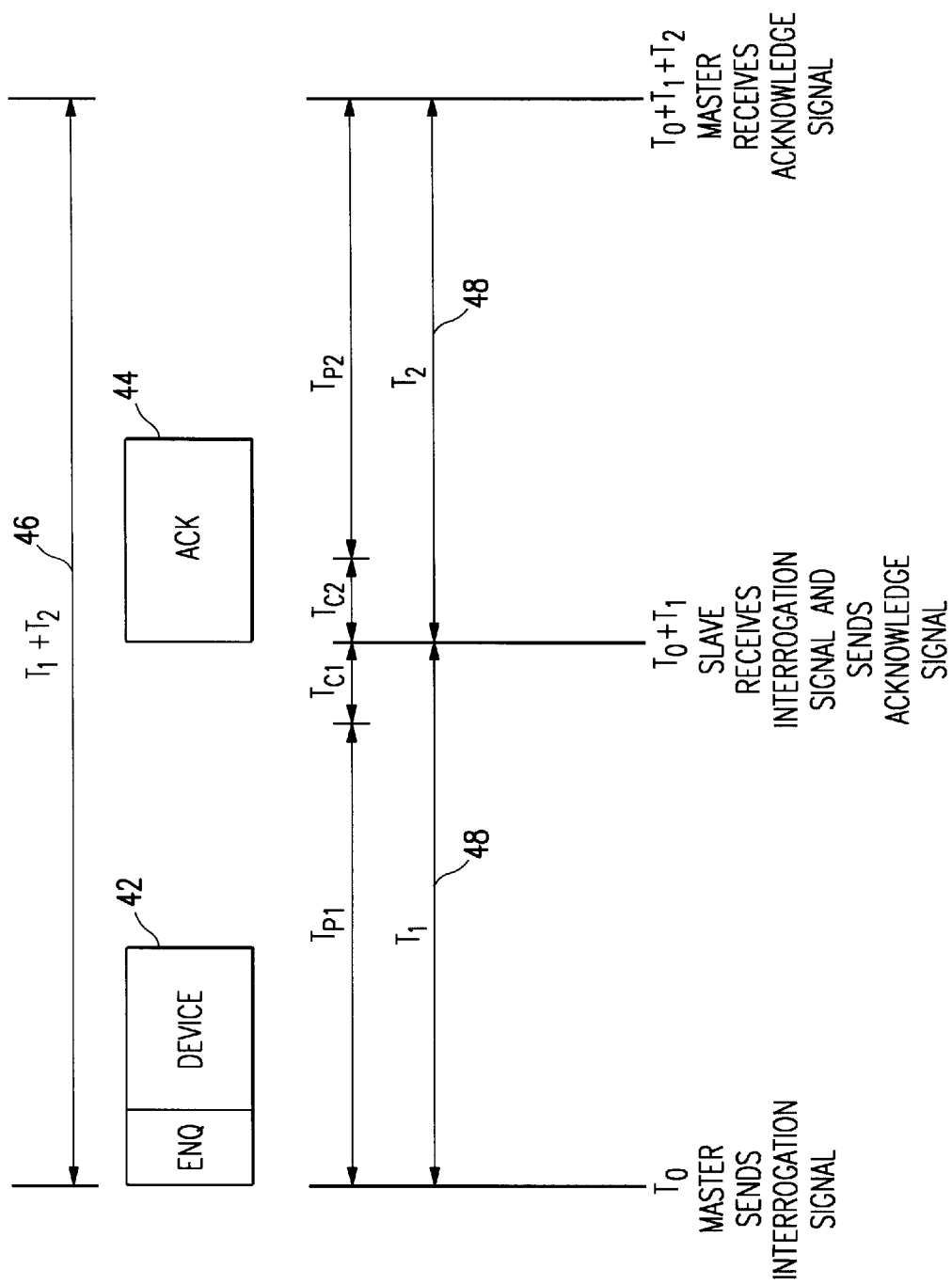
FIG. 2 is an exemplary timing diagram for communications between the master and a slave control device of the system of FIG. 1.

FIG. 2 shows an exemplary timing diagram for communications between the master device 12 and a slave control device 14. In this example, it is assumed that there is a first transit time $T_1$ from the master control device 12 to the slave control device 14. The first transit time is comprised of $T_{p1}$ (the physical delay) and $T_{c1}$ (the communication processing delay). Similarly, there is a second transit time $T_2$ from the slave control device 14 to the master control device 12 of $T_{p2}$ and $T_{c2}$. Accordingly, if the master control device 12 sends an interrogation command 42 (e.g., ENQ-DEVICE) at time $T_0$ to a selected slave control device 14, the command will arrive at the slave control device 14 at a time $T_0+T_1$. The slave control device 14 then sends a reply message 44 (e.g., an ACK, a sequence of characters including the interrogation command and/or the time of receipt, etc.) which arrives back at the master control device 12 at a time $T_0+T_1+T_2$, i.e., after a loop communication delay of $T_1+T_2$ (i.e., $T_{p1}+T_{p2}+T_{c1}+T_{c2}$). Typically, the physical delays are essentially identical in both directions across the communication path 16 and the communication processing delays are similar and/or can be designed to be similar. Accordingly, if the total loop communication delay 46 is monitored in reference to the master clock circuitry 18 and/or the master time 22, the loop communication delay can be measured. Then, if the loop communication delay 46 (i.e., $T_1+T_2$) is divided by 2, the transit time delay 48 (i.e., $T_1$ or $T_2$) can be determined. Using this transit time delay 48, various methods can be used to either actually synchronize (e.g., within the measurement errors of the transit time delay) the slave times 30 or compensate for the known time setting errors for each of the slave control devices 14.

Figure 3A:
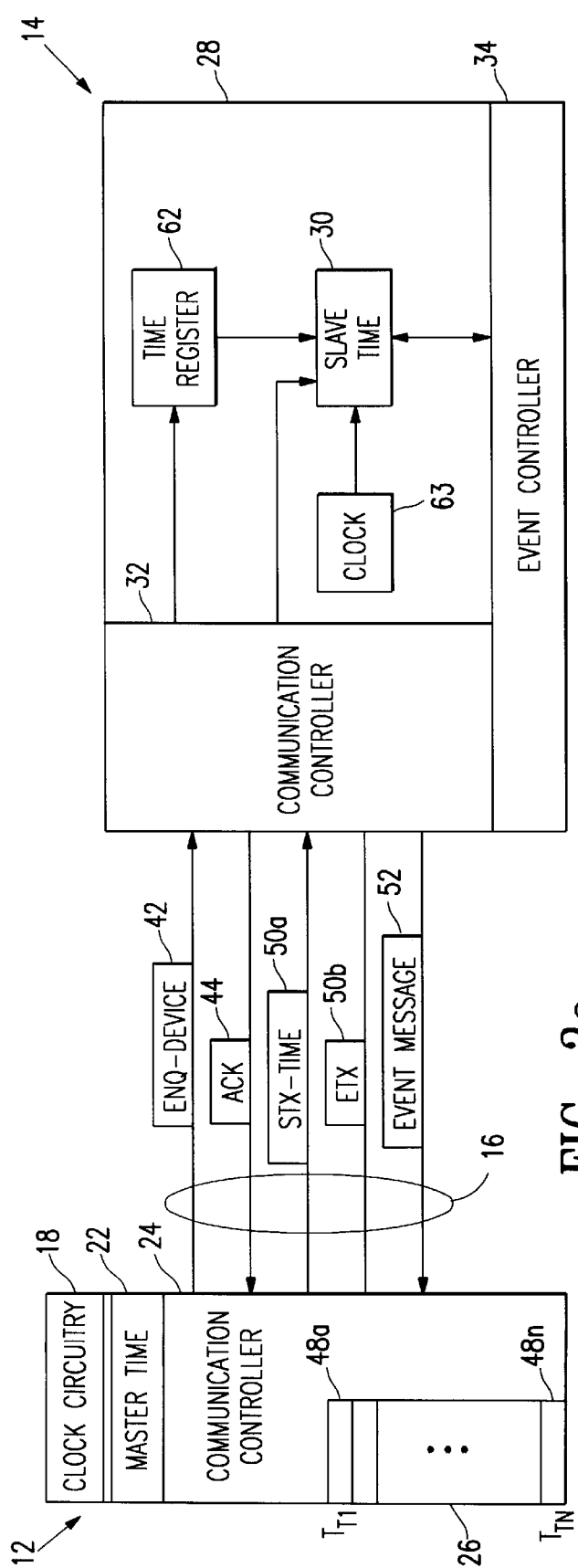
FIG. 3a is a functional block diagram of methods of synchronizing the clocks of the system of FIG. 1 by alternatively compensating time values received from the slave control devices or adjusting the time values sent to the slave control devices in accordance with the transit time delays of each slave control device.
Figure 9:
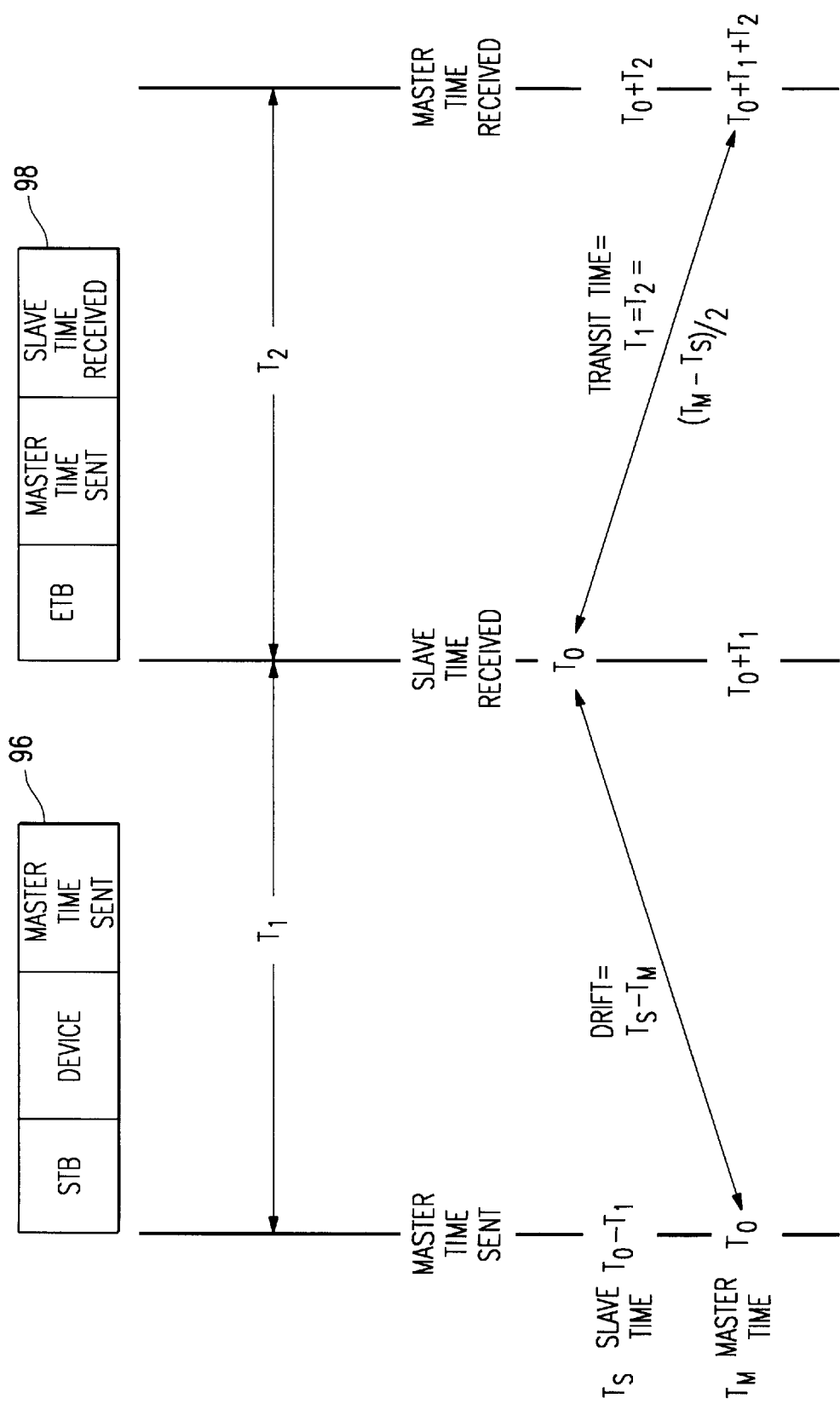
FIG. 9 shows an exemplary timing diagram for verifying the accuracy of the slave time.

In the embodiment illustrated in FIG. 3a (referred to as embodiment A and discussed further in reference to FIG. 9), the slave control device 14 is periodically commanded by the master control device 12 using a clock set command 50 (e.g., STX-TIME) to synchronize its time 30 to the master time 22. Preferably, the clock set command 50 is globally sent to all of the slave control devices 14. Of course, when each slave control device 14 receives this command, it is now a transit time delay $T_{Tx}$ (corresponding to each device) later. Thus, the slave time 30 will be slow by a value $T_{Tx}$. Accordingly, if slave control device number 1 reported that an event occurred at a slave time $T_S$, that event would have actually occurred at a master time $T_M$ where $T_M=T_S+T_{T1}$. Thus, when the master control device 12 receives a time-stamped event message 52, it preferably adjusts the reported time, e.g., $T_S$, by adding a stored delay value $T_{T1}$, corresponding to that slave control device 14, from the offset register 26. Accordingly, the adjusted reported time will be $T_S+T_{T1}$, which is the actual time that the event occurred.

In another embodiment (also illustrated in FIG. 3a), the master control device 12 adjusts its clock set command 50 to set each slave time 30 according to the calculated transit time $T_{Tx}$ for each slave control device 14. Accordingly, the transit time delay $T_{T1}$ for a selected slave control device number 1 is added from the offset register 26 to the master time $T_M$ and this adjusted value $(T_M+T_{T1})$ is sent to the selected slave control device 14. Since the transit time delay $T_{T1}$ (where $T_{T1}=T_{p1}+T_{c1}$) is the time that it has been determined that it takes for a command to be received at the selected slave control device 14, the slave time 30 will be set to a value of $T_M+T_{T1}$ at a time when the actual time is $T_M+T_{T1}$. Thus, the slave time 30 and the master time 22 will contain essentially identical times. Consequently, when an event is reported from the slave control device 14 on the communication path 16 via the time-stamped event message 52, it will be reported with the actual time that the event occurred.

As opposed to the first embodiment, this alternative embodiment requires that a separate clock set command 50 be sent to each slave control device 14 since each slave control device 14 has a different transit time delay 48. As discussed further below, the clock set command 50 is actually divided into two intervals. A first portion 50a is used to send a desired time value to the slave device 14 and a second portion 50b is used to instruct the slave device 14 to set its slave time 30 to the value it received in the first portion 50a of the clock set command. While the first portion 50a corresponds to each slave device 14, the second portion 50b need not be. Accordingly, while the first portions 50a are directed to each slave device 14, the second portion 50b can be sent globally to all of the slave control devices 14.

In a next embodiment (see FIG. 4a), the transit time delay value $T_{T1}$ which was calculated in the master control device 12, is sent to the slave control device 14 where it is saved in an offset memory 54. Consequently, this value $T_{T1}$ can be used in adjusting the slave time 30 at the slave control device 14. In this embodiment, the offset register 26 in the master control device 12 can be a temporary storage for a single transit time delay value in the main control device 12 before this transit time delay value is sent to the selected slave control device 14. Alternatively, the offset register 26 can be large enough to retain all transit time delay values $T_{Tx}$ before they are selectively sent to the slave control devices 14. Preferably, this offset memory value 54 is added to the clock set time, e.g., $T_M$, so that the slave time 30 will be initially set to $T_M+T_{Tx}$ at an actual time corresponding to $T_M+T_{Tx}$. Consequently, when an event is reported from the slave control device 14, it will be reported with the actual time, i.e., $T_M$ at the time of the occurrence of the event, since the slave time 30 and the master time 22 are essentially identical. Alternatively, the slave time 30 can be set to the value received in the clock set message 50 and the value stored in the offset memory 54 can then be used to adjust the times reported for an event. For example, if the slave time 30 is slow due to the transit time delay $T_{T1}$, adding a value of $T_{T1}$ to the slave time 30 when an event occurs will again result in the actual time being reported.

Figure 5:
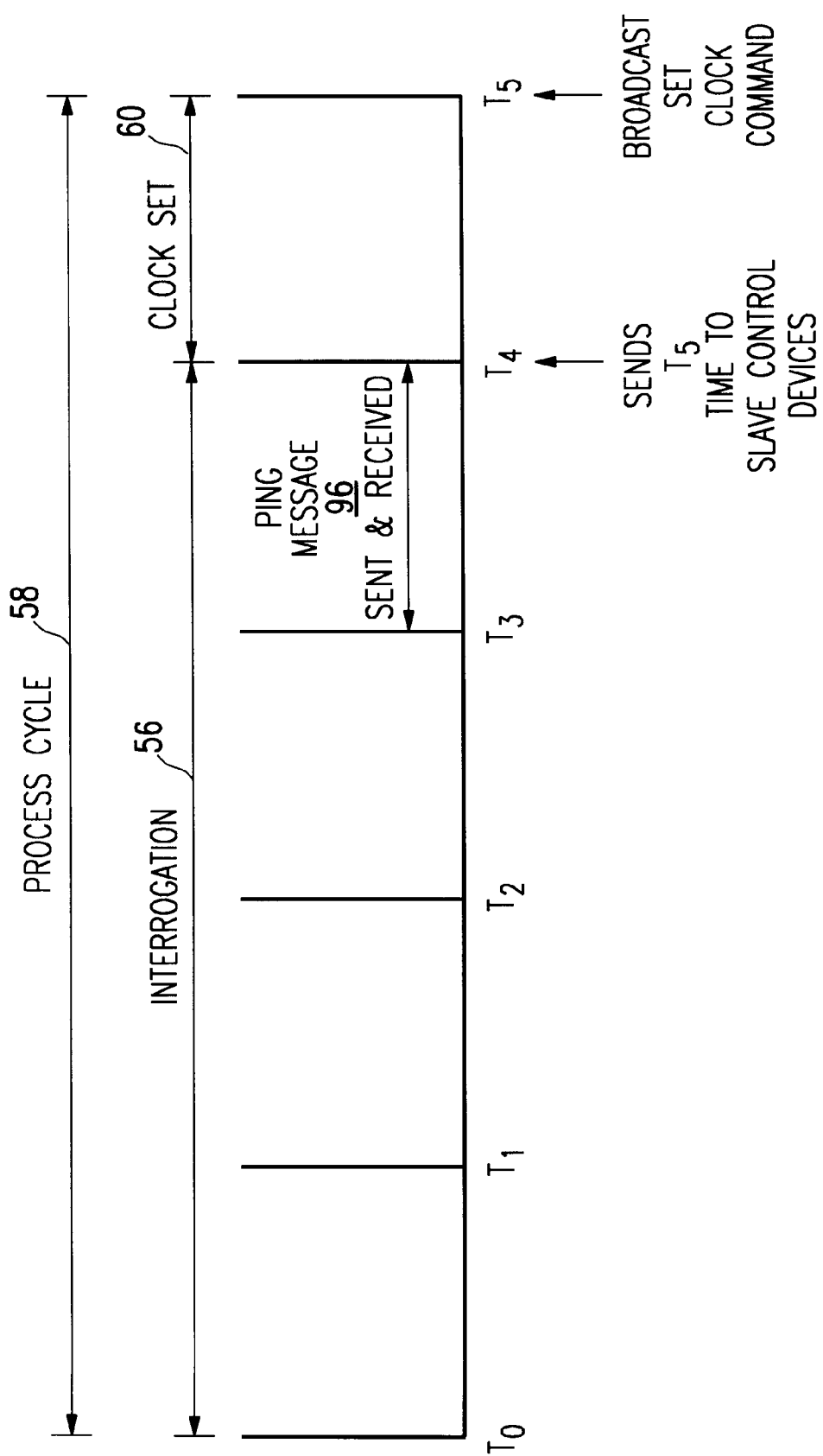
FIG. 5 is a timing diagram for the process of interrogating and synchronizing the slave control devices of FIG. 1.

FIG. 5 shows a timing diagram for the process of interrogating and synchronizing the slave control devices 14. Preferably, this process is repeated at a periodic cycle rate, e.g., 5 seconds in a preferred embodiment, in response to the fixed frequency output 20 (typically a 1 Hz clock) from the master clock circuitry 18. In a first portion 56 (comprised of 4 one second intervals in a preferred embodiment) of this process cycle 58 beginning at $T_0$, interrogation occurs to determine the transit time delay for each slave control device 14. Depending upon the number of slave control devices 14 and the duration of the interrogation cycle portion 56, the interrogation of each slave control device 14 can occur multiple times within each one second interval. Alternatively, for large numbers of slave control devices 14, it may be desirable to extend the interrogation cycle portion 56 to a time greater than 4 seconds to permit multiple interrogations of the large number of slave control devices 14 by the master control device 12. The master control device 12 preferably averages the calculated transit time delay 48, e.g., using a weighted average. Additionally, it is preferred that the master control device 12 discards any transit time delay values that are significantly different from the calculated average, e.g., greater than a 2 sigma difference from the current average.

In the second portion 60 of the cycle 58, the slave control devices 14 are set to a clock time corresponding to the master time 22. Initially, the master control device 12 sends a clock value set command 50a (e.g., STX-TIME) via the communication path 16 to each of the slave control devices 14. The time value in this command preferably corresponds to what will be the time at the conclusion of this interrogation/synchronization process cycle 58, e.g., $T_0+5$. At the conclusion of the set portion 60 of this cycle 58, a clock set command 50b (e.g., ETX) is sent via the communication path 16, preferably as a global command, to cause the previously sent clock set value to actually be loaded into the slave time 30.

There are various methods of processing the set clock command portions 50a and 50b. FIG. 3a shows an embodiment where the clock value set command 50a is used to store a value in a temporary time register 62. However, it is not until the clock set command 50b is received that the value in the temporary time register 62 is stored into the slave time 30. Afterwards, the slave time 30 continues counting the time in response to a clock 63 within the clock circuitry 28.

Figure 3B:
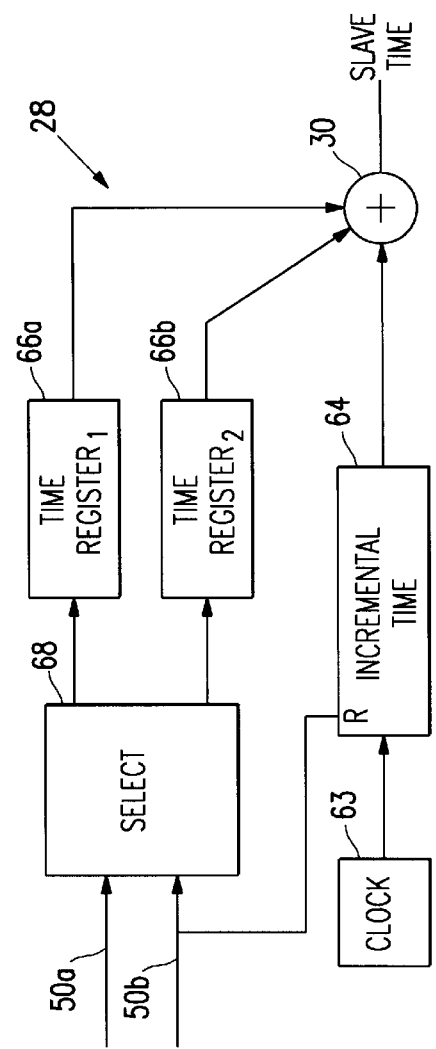

FIG. 3b shows the clock circuitry 28 of another preferred embodiment where the clock circuitry 28 maintains only an incremental minor (m) portion of the slave time 30 in an incremental time register 64 and two or more time registers 66 are used to store the major (M) time portion of the slave time (e.g., MM:MM:MM.mmmmmm). In this embodiment, one of the two registers 66a and 66b is active and the other is inactive. The active register forms the major portion of the time and the inactive register is available for receiving a time value from the clock value set command 50a. When the clock value set command 50b is received, the active and inactive registers 66a and 66b are switched according to selection logic 68 and the incremental time register 64 is reset. Afterwards, the active time register 66 is combined (either by addition or concatenation) with the incremental time register 64 to form the slave time 30. The incremental time register 64 continues to count in response to a clock 63 within the clock circuitry 28 and thus, the slave time 30 continuously tracks the time of day.

Figure 4A:
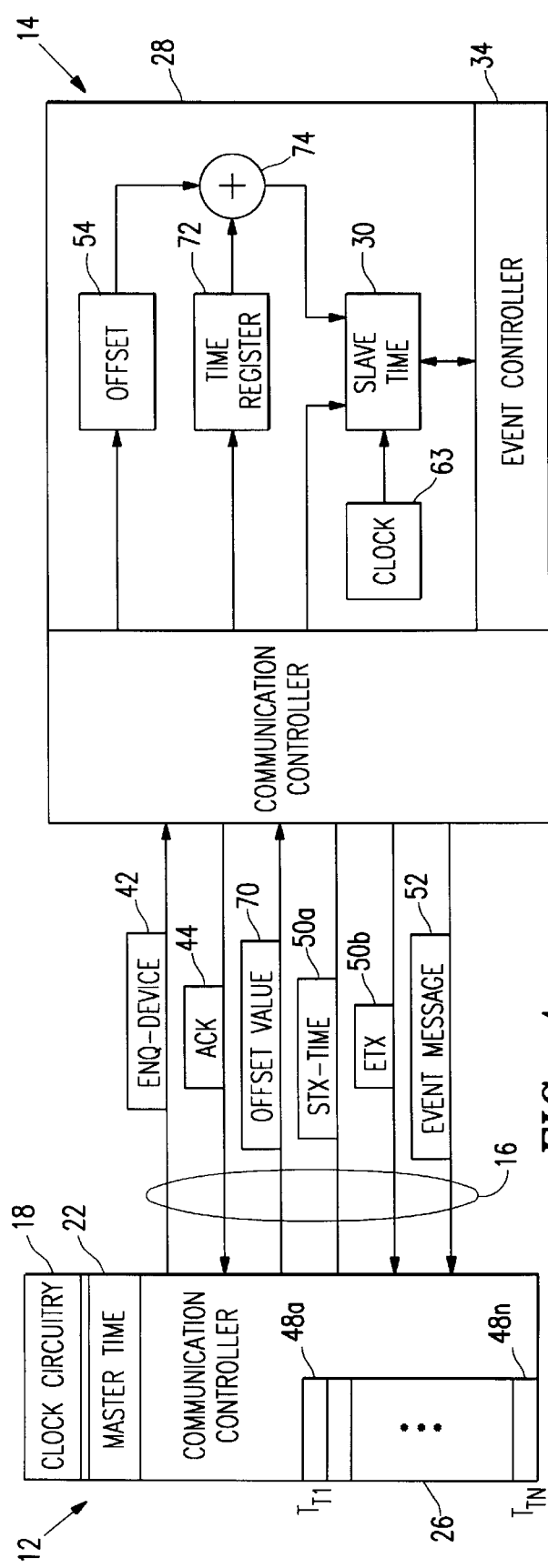
FIG. 4a is a functional block diagram of an alternative method of synchronizing the clocks of the system of FIG. 1 by passing a corresponding offset value to each slave control device.

In another embodiment, shown in FIG. 4a, the transit time delay value is sent via command 70 from the master control device 12 to the slave control device 14 where it is stored in the offset memory 54. In this embodiment, the clock value set command 50a sets a temporary time register 72. An adder 74 adds the value stored in the offset memory 54 to the value in the temporary time register 72 and stores this value in the slave time 30 when the clock set command 50b is received.

Figure 4B:
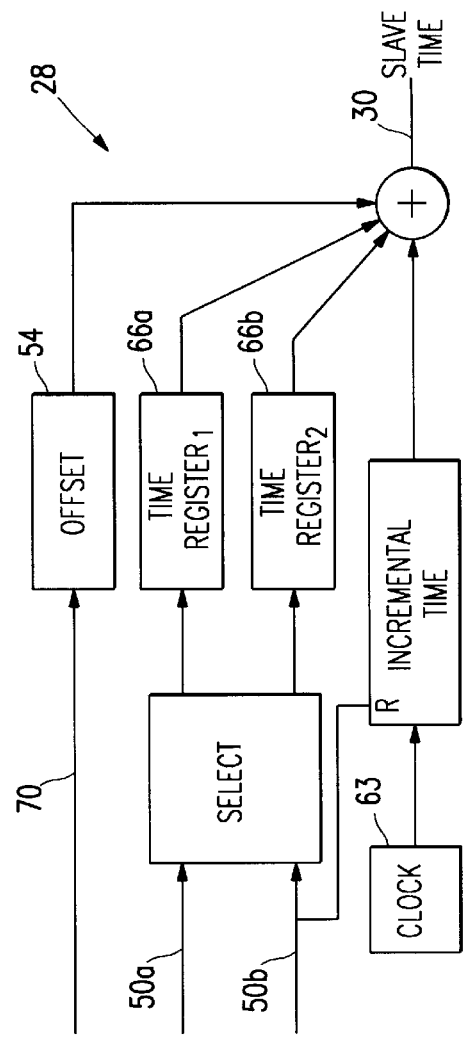

In still another embodiment of the clock circuitry 28, shown in FIG. 4b, the embodiments of FIGS. 3 and 4 are combined, i.e., a pair of temporary time registers 66 and an offset memory 54 are each present in the slave control device 14. Accordingly, this embodiment combines the functionality of the embodiment of FIG. 3b with that described in reference to FIG. 4a.

For systems practicing these aspects of the present invention, the precision of the clock circuitry 28 within the slave control devices 14 can be relatively low since the slave time 30 driven by the clock circuitry 28 is resynchronized to the master time 22 each process cycle 58, e.g., every five seconds. Accordingly, the slave clock circuitry 28 need only be accurate enough to maintain a desired level of accuracy for the duration of each process cycle 58, e.g., for a five second period. Additionally, the master clock circuitry 18 need not be very precise when the slave devices 14 are coupled to a single master 12 and only the relative times of slave device events are needed. Typically, a desired short term accuracy of less than 100 microseconds for a one hour period is acceptable for many applications. Accordingly, significant cost savings can be achieved with embodiments of the present invention, e.g., oven-controlled oscillators are not required.

Figure 6:
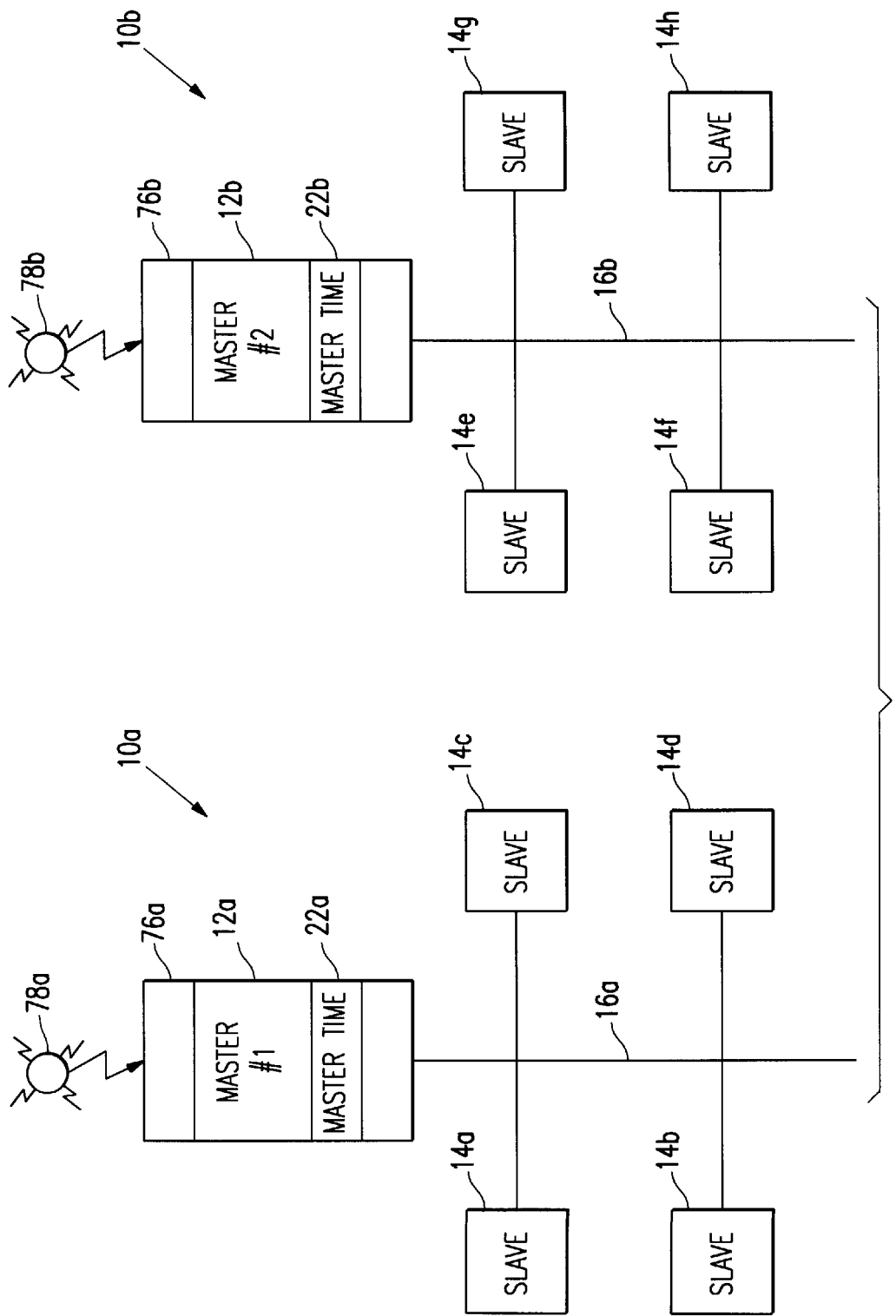
FIG. 6 is a block diagram of a pair of clock synchronization systems synchronized to each other via the use of GPS receivers.

However, in other circumstances (see FIG. 6), it is desirable to have a global reference clock so that a group of geographically-distributed devices can be synchronized without having a common communication interface 16. Accordingly, a GPS receiver 76 that is responsive to one or more geosynchronous satellites 78 can be used that provides a highly stable 1 Hz clock signal 80 and a GPS time 82 that is traceable to a known source, e.g., the United States Naval Observatory (USNO). Depending on the application, the GPS time (generally Universal Co-ordinated Time (UTC)) can be adjusted according to the geographical location on the earth of the GPS receiver 76. Such a GPS receiver is manufactured by Motorola under the designation of the Motorola Oncore Remote GPS Receiver. The clock signal 80 and time outputs 82 of the GPS receiver 76 (see FIG. 1) can be used via clock trainer circuitry 84 to adjust the master clock circuitry 18. Accordingly, the slave control devices 14a–14h in clock synchronization systems 10a and 10b can be synchronized to each other via their separate communication channels 16a and 16b since the master times 22a and 22b are synchronized to each other via their respective GPS receivers 76a and 76b. Since a physical connection is not required between discrete clock synchronization systems 10 of the present invention, systems 10 can be distributed over large geographical areas where a physical connection between communication paths is essentially impossible or even in areas where a physical connection is just difficult.

Figure 7:
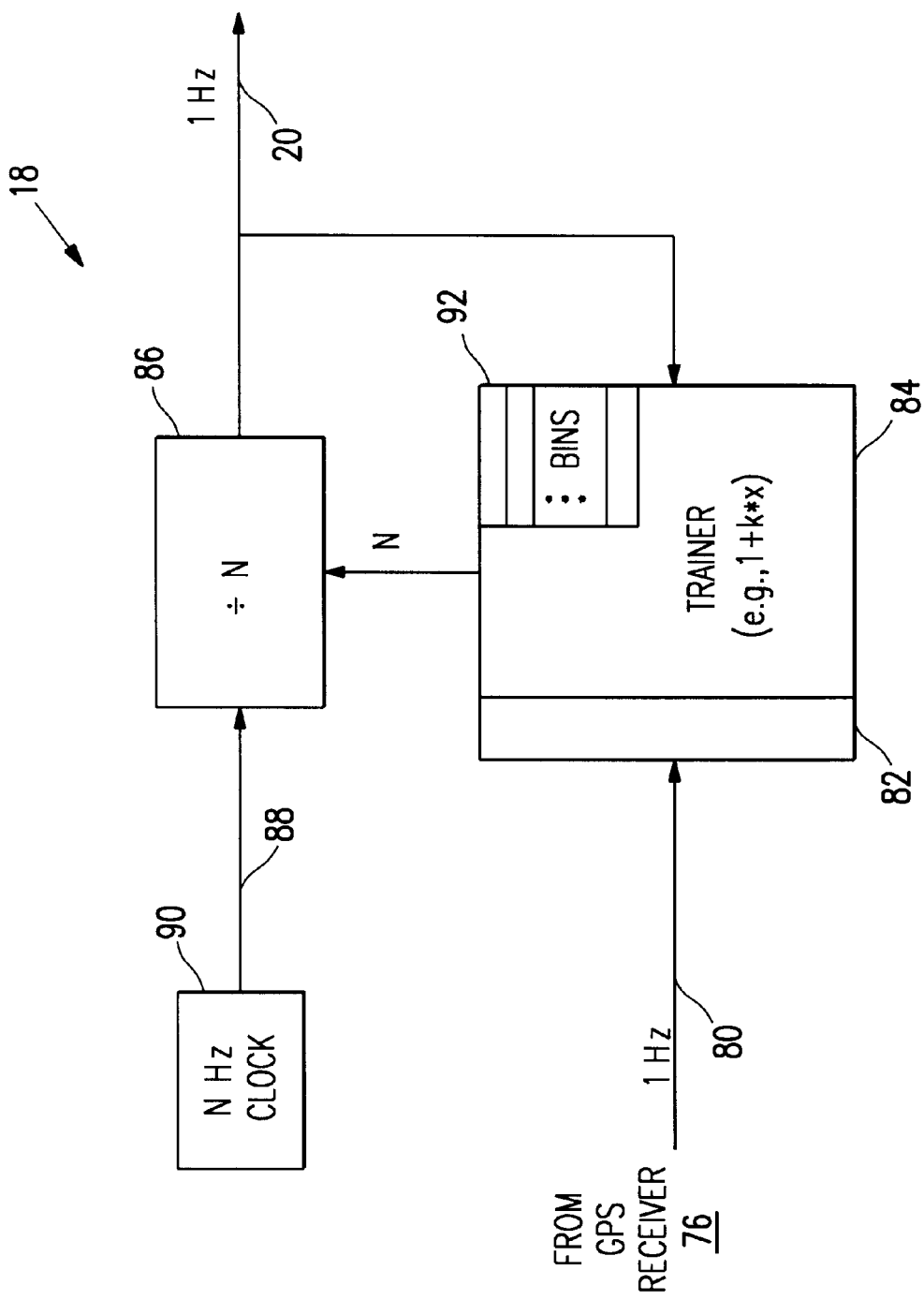
FIG. 7 shows an exemplary implementation of clock training circuitry for adapting the clock circuitry to a clock from a GPS receiver.

FIG. 7 shows an exemplary implementation of the clock circuitry 18 and the clock trainer 84 which responds to the precision 1 Hz clock 80 from the GPS receiver 76 to synchronize the master clock circuitry 18. In a preferred embodiment, the clock trainer 84 slowly adjusts to an edge, e.g., the leading edge, of the 1 Hz clock 80 in order to withstand occasional errors or outages from the GPS receiver 76. Accordingly, an edge of the 1 Hz clock 80 is detected by an edge detector 82, e.g., a Schmidt trigger, and its output is used to slowly adjust the division factor N of a counter 86. The counter 86 receives an N Hz clock signal 88 from clock 90 which, after division by the counter 86, generates the 1 Hz fixed frequency output 20. For example, if a 20 MHz clock 90 is divided by a factor of 20,000,000, a 1 Hz fixed frequency output 20 would result. However, if clock 90 drifted to 20,000,100 Hz, the trainer 84 would need to similarly adjust counter 86, i.e., to a division factor of 20,000,100. Preferably, the trainer 84 adaptively adjusts its division factor by a portion of a detected error (e.g., 1+k*x, where x is the amount of error and k is a small adjustment factor). For example, with a k factor of 0.1 and an error x of 100 Hz (20,000,100−20,000,000) the next entry to counter 86 would be 20,000,000+(0.1*100) or 20,000,010. Similarly, the next sequential value would be 20,000,010+(0.1*90) or 20,000,019. Accordingly, such an algorithm is relatively immune to transient errors.

As previously discussed, it is preferred that the master clock circuitry be accurate enough to maintain a desired, e.g., 100 microsecond or less, short term accuracy e.g., for a period of an hour. However, it is also desirable to retain the desired accuracy for a longer GPS outage period, e.g., 24 hours, without the expenditure for an oven controlled or other costly precision clock 90. It has been observed that the drift of non oven controlled clocks tend to be related to the time of the day, e.g., as a result of the ambient temperature. Accordingly, if the drift is measured throughout a 24 hour period, e.g., by accumulating the interim values determined by the trainer 84, in bins 92, e.g., one per each hour of the day, these values can be used to accommodate clock drifts if the GPS signal 80 is subsequently lost. Additionally, the values in these bins 92 can be interpolated to further accommodate for drift of clock 90.

Figure 8:
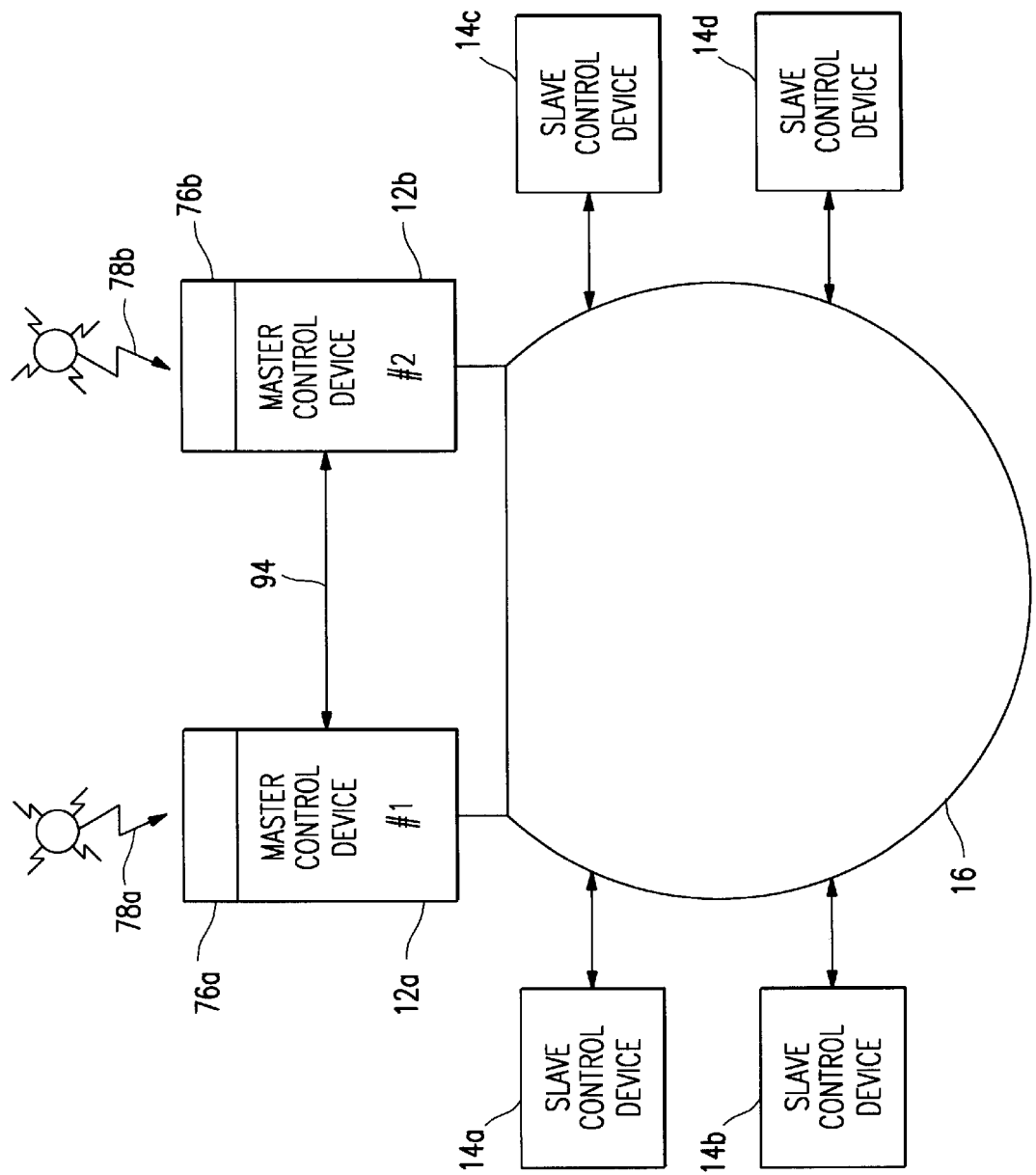
FIG. 8 shows a system which employs two master control devices connected to a plurality of slave control devices across a single communication path.

The present invention is useful in providing protection from failures. For example, FIG. 8 shows a system which employs two master control devices 12a and 12b connected to a plurality of slave control devices 14a–14c across a single communication path 16. In this case, the master control devices 12a and 12b are interconnected via a monitor path 94 where one master control device, e.g., 12b, is inactive but monitoring the operation of the other master control device 12a which is communicating with the slave control devices 14a–14c. However, if master control device 12a or its associated GPS receiver 76a should fail, master control device 12b can take over the communication path 16 in its place.

Additionally, the present invention is useful in predicting failures. Since the present invention periodically determines the transit time delays 48 for messages to the slave control devices 14, a periodic trend in a transit time delay 48 could be used to predict a future failure. In the event that a periodic trend predicts a failure, event reports originating from such a slave control device 14 can be designated as degraded until the system 10, e.g., the slave control device 14 or communication path channel 16 is serviced.

Preferably (as shown in FIG. 9), a ping message 96 (e.g., STB-DEVICE-MASTER TIME SENT) is periodically sent (e.g., during a portion of each interrogation cycle 56 shown in FIG. 5) from the master control device 12 to each slave control device 14. Upon receipt by the selected slave control device 14, a ping reply message 98 (e.g., ETB-MASTER TIME SENT-SLAVE TIME RECEIVED) is generated at the selected slave control device 14 by including the slave time 30 that the ping message 96 was received and sent back to the master device 12. Upon receipt by the master control device 12, the master control device 12 now knows the master time 22 that the ping message 96 was sent (MASTER TIME SENT), the slave time 30 that the ping message 96 was received (SLAVE TIME RECEIVED), and the master time 22 that the ping reply message 98 was received (MASTER TIME RECEIVED). The analysis of these times depends upon which embodiment is implemented for processing the transit time delays 48. In the first disclosed embodiment (embodiment A), the transit time delays 48 are retained in the offset register 26 in the master control device 12 and the event times reported from each slave control device 14 are adjusted by the master control device 12 using these transit time delays 48. Thus, the slave time 30 should lag the master time 22 by its associated transit time delay 48. Accordingly, the SLAVE TIME RECEIVED should only differ from the MASTER TIME SENT if there is a clock drift between when the slave time 30 is set (at the conclusion of the process a cycle 58) and the transmission of the ping message 96. Accordingly, the ping message 96 is preferably sent near the end of the interrogation cycle 56 to monitor the clock drift after a predetermined period of time, e.g., 3 seconds, and to thus confirm the accuracy of the system 10. The difference between the MASTER TIME RECEIVED and the SLAVE TIME RECEIVED reflects the loop communication delay 46 or twice the transit time delay 48 and should essentially correspond to the earlier interrogation measurements. Such a series of communications and calculations provide a way to verify the accuracy of the previously described training procedure and/or an alternative method of measuring the transit time delay 48. These techniques can be further expanded to measure other operating characteristics of the system 10 and such additional techniques are also considered to be within the scope of the present invention. For example, the slave control device 14 could also measure the slave time 30 that the ping reply message 98 was generated and add this time to the sent ping reply message 98. Accordingly, the communication processing delays could then be determined.

Although the present invention has been described in detail with reference only to the presently-preferred embodiments, those of ordinary skill in the art will appreciate that various modifications can be made without departing from the invention. For example, while event recorders that respond to local events and remotely-controlled timing modules that cause local events to occur have been disclosed as exemplary slave control devices, other devices which adaptively synchronize their local clocks to a master control device's clock via a communication channel are considered to be within the scope of the present invention. Accordingly, the invention is defined by the following claims.

We claim:

1. A system for synchronizing clocks in a plurality of slave control device interconnected via a communication channel, said system comprising:
   a master control device comprising:
      master clock circuitry for maintaining an essentially fixed frequency output and a master time;
      a communication controller for periodically sending an interrogation signal to each of said slave control devices and receiving an acknowledgment signal from each of said slave control devices in response thereto, each said acknowledgment signal characterized by a time delay corresponding to each said slave control device; and an offset register for storing one or more time delay values corresponding to each said slave control device, said offset register storing said one or more time delay values between periodic interrogations of said slave control devices;

at least one slave control device comprising:

clock circuitry for maintaining a slave time;

a communication controller for receiving said interrogation signal and sending said acknowledgment signal in response thereto; and an event controller for operating in association with said slave clock circuitry; and a communication channel for providing a bidirectional communication path between said master control device and each of said slave control devices for sending and receiving said interrogation and said acknowledgment signals wherein said slave communication controller is additionally responsive to a synchronization signal sent from said master control device across said communication channel, used in conjunction with an associated time delay value in said offset register, to cause said slave time to essentially synchronize with said master time.

2. The system of claim 1 wherein said slave control device additionally comprises:

two or more slave time registers for controlling the operation of said slave clock circuitry; and wherein said slave time registers are alternately operational to receive a time essentially corresponding to said master time and responsive to said synchronization signal to cause said slave clock circuitry to operate in response to said operational slave time register.

3. The system of claim 1 additionally comprising:

GPS apparatus for receiving a GPS signal and generating a GPS fixed frequency output and a GPS time; and wherein said master clock circuitry is responsive to said GPS time and said GPS fixed frequency output in maintaining said master clock fixed frequency output at an essentially fixed frequency and said master time corresponding to said GPS time.

4. The system of claim 1 wherein said slave control device additionally comprises:

an offset register for storing a value from said offset register associated with said slave control device; and wherein said offset register value is used in determining said slave time.

5. The system of claim 1 wherein said slave time corresponds to said master time within 100 microseconds.

6. The system of claim 1 wherein said event controller additionally comprises means for detecting an event and storing said slave time of said event.

7. The system of claim 6 wherein said slave control device additionally comprises:

means for transferring said stored time to said master control device; and wherein said system further includes means for causing said transferred stored time to essentially correspond to said master time when said event occurred.

8. The system of claim 7 wherein said transferred stored time corresponds within 100 microseconds to said master time when said event occurred.

9. The system of claim 1 wherein said event controller additionally comprises:

an output driver for causing an event to occur; and means for causing said output driver to be activated at a time essentially corresponding to a predetermined master time.

10. The system of claim 1 wherein said communication channel comprises a signal path implemented according to an RS-485 interface.

11. The system of claim 1 wherein said system additionally comprises communication means for verifying the accuracy of said slave time as compared to said master time.

12. A method of synchronizing clocks in a plurality of slave control devices interconnected via a communication channel to a master control device, said method comprising the steps of:

periodically sending an interrogation message from said master control device to each of said slave control devices;

sending an acknowledgment message from said slave control devices to said master control device upon receipt of said interrogation message;

determining a time delay corresponding to each of said slave control devices;

storing a value corresponding to each of said time delays in said master control device;

periodically sending a master time globally to said slave control devices;

receiving said master time in each of said slave control devices; and said slave control devices setting a slave time in accordance with said received master time.

13. The method of claim 12 additionally comprising the steps of:

sending an event message from an originating slave control device to said master control device in response to an event; said event message time stamped in accordance with said slave time;

said master control device receiving said time-stamped event message; and adjusting said received time stamp in accordance with said stored time delay value corresponding to said originating slave control device.

14. The method of claim 12 additionally comprising the steps of:

sending a command message from said master control device to a destination slave control device; said command message designating a future master time within, adjusted by said stored time delay value corresponding to said destination slave control device, to actuate an output driver;

said destination slave control device receiving said command message; and said destination slave control device actuating an output driver at a time when its slave time essentially corresponds to said future master time designated within said command message.

15. The method of claim 12 additionally comprising the steps of:

said master control device periodically receiving a time and frequency signal; and said master control device adjusting a master clock frequency and master time in response thereto.

16. The method of claim 12 wherein said periodically sending a master time step occurs at a rate of essentially every 5 seconds or less.

17. The method claim 12 wherein said periodically sending an interrogation message step occurs at a rate of essentially every 5 seconds or less.

18. A method of synchronizing clocks in a plurality of slave control devices interconnected via a communication channel to a master control device, said method comprising the steps of:
  periodically sending an interrogation message from said master control device to each of said slave control devices;
  sending an acknowledgment message from said slave control devices to said master control device upon receipt of said interrogation message;
  determining a time delay for each of said slave control devices;
  sending a value corresponding to said time delay to its associated slave control device;
  storing said corresponding time delay value in said associated slave control device;
  periodically sending a master time globally to said slave control devices;
  receiving said master time in each of said slave control devices; and
  said slave control devices setting a slave time in accordance with said received master time.

19. The method of claim 18 wherein said setting step additionally comprises setting said slave time in accordance with said stored delay value as well as said received master time; said slave time being essentially identical with said master time.

20. The method of claim 18 additionally comprising the steps of:
  sending an event message from an originating slave control device to said master control device in response to an event; said event message time stamped in accordance with said slave time; and
  said master control device receiving said time-stamped event message.

21. The method of claim 18 additionally comprising the steps of:
  sending a command message from said master control device to a destination slave control device; said command message designating a future master time within to actuate an output driver;
  said destination slave control device receiving said command message; and
  said destination slave control device actuating an output driver at a time when its slave time essentially corresponds to said future master time designated within said command message.

22. The method of claim 18 additionally comprising the steps of:
  said master control device periodically receiving a time and frequency signal; and
  said master control device adjusting a master clock frequency and master time in response thereto.

23. The method of claim 18 wherein said periodically sending a master time step occurs at a rate of essentially every 5 seconds or less.

24. The method claim 18 wherein said periodically sending an interrogation message step occurs at a rate of essentially every 5 seconds or less.

25. A method of synchronizing clocks in a plurality of slave control devices interconnected via a communication channel to a master control device, said method comprising the steps of:
  periodically sending an interrogation message from said master control device to each of said slave control devices;
  sending an acknowledgment message from said slave control devices to said master control device upon receipt of said interrogation message;
  determining a time delay corresponding to each of said slave control devices;
  storing a value corresponding to each of said time delays in said master control device;
  periodically sending a master time adjusted by a corresponding time delay value of each slave control device to each of said slave control devices;
  receiving said master time adjusted by said corresponding time delay value in each of said slave control devices; and
  said slave control devices setting a slave time in accordance with said received adjusted master time.

26. The method of claim 25 additionally comprising the steps of:
  sending an event message from an originating slave control device to said master control device in response to an event; said event message time stamped in accordance with said slave time; and
  said master control device receiving said time-stamped event message.

27. The method of claim 25 additionally comprising the steps of:
  sending a command message from said master control device to a destination slave control device; said command message designating a future master time within to actuate an output driver;
  said destination slave control device receiving said command message; and
  said destination slave control device actuating an output driver at a time when its slave time essentially corresponds to said future master time designated within said command message.

28. The method of claim 25 additionally comprising the steps of:
  said master control device periodically receiving a time and frequency signal; and
  said master control device adjusting a master clock frequency and master time in response thereto.

29. The method of claim 25 wherein said periodically sending a master time step occurs at a rate of essentially every 5 seconds or less.

30. The method claim 25 wherein said periodically sending an interrogation message step occurs at a rate of essentially every 5 seconds or less.

31. A master control device for synchronizing times in a plurality of slave control devices interconnected via a communication channel, said master control device comprising:
  master clock circuitry for maintaining an essentially fixed frequency output and a master time;
  a communication controller for periodically sending an interrogation signal to each slave control device and receiving an acknowledgment signal from each slave control device in response thereto; each said acknowledgment said characterized by a time delay corresponding to each slave control device; and
  an offset register for storing one or more time delay values corresponding to each slave control device, said offset register storing said one or more time delay values between periodic interrogations of said slave control devices.

32. A slave control device interconnected via a communication channel to a master control device for receiving messages to cause a slave time to synchronize to a master time in the master control device, said slave control device comprising:

clock circuitry for maintaining a slave time;

a communication controller for receiving an interrogation signal from the master control device and sending said acknowledgment signal in response thereto;

an event controller for operating in association with said slave clock circuitry; and wherein said master control device periodically sends an interrogation signal to said slave control device and said slave control device sends an acknowledgment signal in response thereto to determine a time delay for said slave control device and said slave communication controller is additionally responsive to a synchronization signal sent from the master control device across the communication channel used in conjunction with said time delay value to cause said slave time to essentially synchronize with the master time.

33. The slave control device of claim 32 additionally comprising:

an offset memory for storing said time delay value; and wherein said offset said time delay value is used in determining said slave time.

34. A system for synchronizing clocks in a plurality of slave control device interconnected via a communication channel, said system comprising:

a master control device comprising:

master clock circuitry for maintaining an essentially fixed frequency output and a master time;

a communication controller for periodically sending an interrogation signal to each of said slave control devices and receiving an acknowledgment signal from each of said slave control devices in response thereto, each said acknowledgment signal characterized by a time delay corresponding to each said slave control device; and an offset register for storing one or more time delay values corresponding to each said slave control device;

at least one slave control device comprising:

clock circuitry for maintaining a slave time;

a communication controller receiving said interrogation signal and sending said acknowledgment signal in response thereto;

two or more slave time registers operational in setting a slave time and alternately operational to receive signals corresponding to said master time; and an event controller operating in association with said slave clock circuitry; and a communication channel for providing a bidirectional communication path between said master control device and each of said slave control devices for sending and receiving said interrogation and said acknowledgment signals wherein said slave communication controller is additionally responsive to a synchronization signal sent from said master control device across said communication channel, used in conjunction with an associated time delay value in said offset register, to cause said slave time to essentially synchronize with said master time.

35. The system of claim 34, wherein a first and second of said two or more slave time registers store respective first and second values of said master time.

36. The system of claim 34, said at least one slave control device further comprising an incremental slave time register holding a time value representative of a time period since a most recent synchronization of said slave time with said master time.

37. The system of claim 36, further comprising an adder coupled to each of said two or more slave time registers and to said incremental slave time register, said adder combining a value in an active one of said two or more slave time registers with a value in said incremental slave time register to produce said slave time.

38. The system of claim 37, wherein a first and second of said two or more slave time registers store respective first and second values of said master time.

39. A method of synchronizing clocks in a plurality of slave control devices interconnected via a communication channel to a master control device, said method comprising the steps of:

periodically sending an interrogation message from said master control device to each of said slave control devices;

sending an acknowledgment message from said slave control devices to said master control device upon receipt of said interrogation message;

determining a time delay corresponding to each of said slave control devices;

storing a value corresponding to each of said time delays in said master control device;

periodically sending a master time globally to said slave control devices;

periodically sending a master time adjustment corresponding to said time delay value of each slave control device to each of said slave control devices;

receiving said master time in each of said slave control devices; and said slave control devices setting a slave time in accordance with said received adjusted master time.

* * * * *